United States Patent
Merrill (10) Patent No.: US 9,619,204 B2
(45) Date of Patent: Apr. 11, 2017

(54) METHOD AND SYSTEM FOR BIN COALESCING FOR PARALLEL DIVIDE-AND-CONQUER SORTING ALGORITHMS

(71) Applicant: NVIDIA Corporation, Santa Clara, CA (US)

(72) Inventor: Duane Merrill, Charlottesville, VA (US)

(73) Assignee: Nvidia Corporation, Santa Clara, CA (US)

( * ) Notice: Subject to any disclaimer, the term of this patent is extended or adjusted under 35 U.S.C. 154(b) by 527 days.

(21) Appl. No.: 13/918,185

(22) Filed: Jun. 14, 2013

(65) Prior Publication Data

US 2014/0372456 A1   Dec. 18, 2014

(51) Int. Cl.
G06F 17/30 (2006.01)
G06F 11/30 (2006.01)
G06F 15/167 (2006.01)
G06F 9/00 (2006.01)
G06F 7/22 (2006.01)
G06F 7/24 (2006.01)

(52) U.S. Cl.
CPC .  *G06F 7/22* (2013.01); *G06F 7/24* (2013.01)

(58) Field of Classification Search
CPC ... G06F 17/30943; G06F 11/30; G06F 15/167
USPC ........................................................ 707/752
See application file for complete search history.

(56) References Cited

U.S. PATENT DOCUMENTS

| | | | | |
|---|---|---|---|---|
| 4,575,798 A | * | 3/1986 | Lindstrom | G06F 7/24 |
| 6,269,375 B1 | * | 7/2001 | Ruddy | G06F 17/30339 |
| 2006/0106832 A1 | * | 5/2006 | Ben-Dyke | G06F 17/30327 |
| 2010/0094590 A1 | * | 4/2010 | Ozonat | G06F 11/3452 |
| | | | | 702/179 |
| 2010/0106724 A1 | * | 4/2010 | Anderson | G06F 17/30979 |
| | | | | 707/737 |
| 2011/0238677 A1 | * | 9/2011 | Kirk | G06F 17/30454 |
| | | | | 707/752 |
| 2012/0232913 A1 | * | 9/2012 | Terriberry | G10L 19/038 |
| | | | | 704/503 |

OTHER PUBLICATIONS

Haibo Lin, Chao Li, Qian Wang, Yi Zhao, Ninghe Pan, Xiaotong Zhuang, and Ling Shao, "Euro-Par 2010—Parallel Processing", 2010, Springer Berlin Heidelberg, "Automated Tuning in Parallel Sorting on Multi-core Architectures" pp. 14-25.*

* cited by examiner

Primary Examiner — Hosain Alam
Assistant Examiner — Robert F May (57) ABSTRACT

A system and method for performing sorting. The method includes partitioning a plurality of keys needing sorting into a first plurality of bins, wherein the bins are sequentially sorted. The plurality of keys is capable of being sorted into a sequence of keys using a corresponding ordering system. The method includes coalescing a first pair of consecutive bins, such that when coalesced the first pair of bins falls below a threshold. The method also includes ordering keys in the first coalesced pair to generate a first sub-sequence of keys in the sequence of keys.

14 Claims, 7 Drawing Sheets

```
1.   Coalesce(
2.     inout int bin_lengths[RADIX_DIGITS],      // The lengths of each child bin
3.     inout int current_bits[RADIX_DIGITS],     // The current radix bit for each child bin
4.     in int B)                                 // Maximum block-sorting threshold
5.   {
6.     bool bin_active[RADIX_DIGITS];
7.
8.     // Initialize bin_active
9.     for i in 0..RADIX_DIGITS-1 in parallel {
10.      bin_active[i] = true;
11.    }
12.
13.    // Progressively coalesce peer bins having stride 1, 2, 4, 8, etc.
14.    for bit in 0..RADIX_BITS-2
15.    {
16.      for i in 0..RADIX_DIGITS-1 in parallel
17.      {
18.        // Attempt to merge bins whose indices are a multiple of current stride
19.        int stride = 1 << bit;
20.        int mask = (1 << (bit + 1)) - 1;
21.        if ((i & mask == 0) && (bin_active[i]))
22.        {
23.          int merged_bin_length = bin_lengths[i] + bin_lengths[i + stride];
24.          if (merged_bin_length < B)
25.          {
26.            // Coalesce peer bin
27.            bin_lengths[i] = merged_bin_length;
28.            bin_lengths[i + stride] = 0;
29.            current_bits[i]++;
30.          }
31.          // Bin is still active if the peer was still active
32.          bin_active[i] = bin_active[i + stride];
33.        }
34.        else {
35.          // Could not coalesce peer
36.          bin_active[i] = false;
37.        }
38.      }
39.    }
40.  }
41. }
```

METHOD AND SYSTEM FOR BIN COALESCING FOR PARALLEL DIVIDE-AND-CONQUER SORTING ALGORITHMS

STATEMENT OF GOVERNMENT INTEREST

This invention was made with Government support under Agreement HR0011-13-3-0001 awarded by DARPA. The Government has certain right in the invention.

BACKGROUND

Sorting is germane to many algorithms in computer science, and software applications frequently rely upon efficient sorting primitives for good performance. A top-down, divide-and-conquer sorting method operates by repeatedly applying a partial ordering to a sequence of keys, creating two or more bins, which can then be sorted independently. More particularly, the simplest top-down sorting approaches operate by recursively partitioning the input until each bin contains only a single key (and is thus trivially sorted).

Most practical implementations switch to another "block-sorting" method when the bin size falls below a certain threshold B. The block-sorting component is typically designed and optimized for problems that fit entirely within the storage resources of a single processor core (viz., registers, cache, shared memory, etc.).

To provide good load-balance amongst parallel processing elements, top-down approaches performed across multiple threads and/or processor cores generally strive to construct uniformly-sized bins for block-sorting, regardless of input size and distribution. Otherwise it is possible for a majority of processing elements handling small or average-sized bins to quickly perform their partitioning responsibilities and then wait idly for a small minority to process much larger bins, thus underutilizing processing resources.

To these ends, comparison-based implementations (e.g., sample sort, quicksort, etc.) have traditionally focused on choosing a dynamic set of "splitting points" that approximate the input sequence's key distribution. This can be done, e.g., by sampling the input keys, sorting the samples, and then selecting splitters from the sorted samples at regular intervals. However, for processor genres having wide parallelism per core (e.g., deep multithreading, SIMD/SIMT/vector, etc.), dynamically adjustable splitting points may be difficult to implement due to the complexities of cooperation between fine-grained parallel processing elements.

Furthermore, such parallel processor genres can incur steep performance penalties for bin sizes that fall short of the ideal block-sorting threshold B. That is, processor efficiency is maximized when the utilization of fast, local storage resources are maximized. In some cases, under-filled bins are caused by 1) non-uniform key distributions that result in uneven bin sizes, and 2) mismatches between the input problem size N and the bin-splitting factor S. In particular, "top-down" sorting operations performed in parallel using the most significant digit (MSD) radix sorting method are prone to producing bin sizes that are substantially smaller than the block-sorting threshold B.

One commonplace method of achieving final block sizes approaching B elements is to dynamically adjust the splitting factor S for each recursive partitioning step. However, it is often difficult to dynamically adjust the splitting factor on such parallel architectures due to the complexities of cooperation between fine-grained parallel processing elements.

SUMMARY

In embodiments of the present invention, a computer implemented method for causing a computer system to perform a method for sorting. In other embodiments, a non-transitory computer readable medium is disclosed having computer-executable instructions for causing a computer system to perform a method for sorting. The method includes partitioning a plurality of keys needing sorting into a first plurality of bins that are sequentially sorted, wherein the plurality of keys is capable of being sorted into a sequence of keys using a corresponding ordering system. The method includes coalescing a first pair of consecutive bins, such that when coalesced said first pair of bins falls below a threshold. The method also includes ordering keys in said first pair to generate a first sub-sequence of keys in said sequence of keys.

In still other embodiments of the present invention, a computer system is disclosed comprising a processor and memory coupled to the processor and having stored therein instructions that, if executed by the computer system, cause the computer system to execute a method for sorting. The method includes partitioning a plurality of keys needing sorting into a first plurality of bins that are sequentially sorted, wherein the plurality of keys is capable of being sorted into a sequence of keys using a corresponding ordering system. The method includes coalescing a first pair of consecutive bins, such that when coalesced said first pair of bins falls below a threshold. The method also includes ordering keys in the first coalesced pair to generate a first sub-sequence of keys in said sequence of keys.

These and other objects and advantages of the various embodiments of the present disclosure will be recognized by those of ordinary skill in the art after reading the following detailed description of the embodiments that are illustrated in the various drawing figures.

BRIEF DESCRIPTION OF THE DRAWINGS

The accompanying drawings, which are incorporated in and form a part of this specification and in which like numerals depict like elements, illustrate embodiments of the present disclosure and, together with the description, serve to explain the principles of the disclosure.

DETAILED DESCRIPTION

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as to not unnecessarily obscure aspects of the present disclosure.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "partitioning," "coalescing," "ordering," "sorting," "generating," or the like, refer to actions and processes (e.g., flowcharts 300A, 300B, and 400 of FIGS. 3A, 3B, and 4, respectively) of a computer system or similar electronic computing device or processor (e.g., system 100). The computer system or similar electronic computing device manipulates and transforms data represented as physical (electronic) quantities within the computer system memories, registers or other such information storage, transmission or display devices.

Figure 3A:
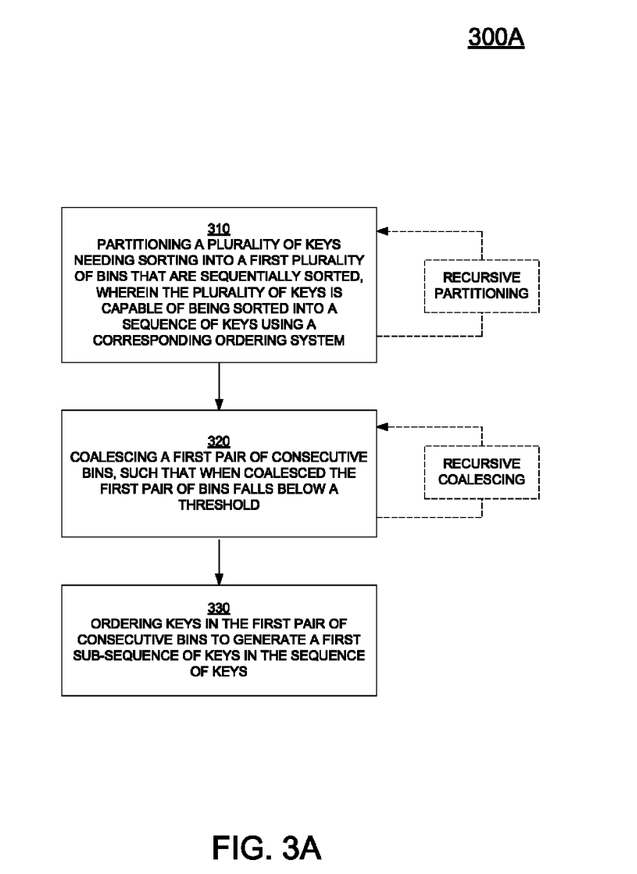
FIG. 3A is a flow diagram illustrating a method for sorting that is capable of performing bin-coalescing, in accordance with one embodiment of the present disclosure.
Figure 3B:
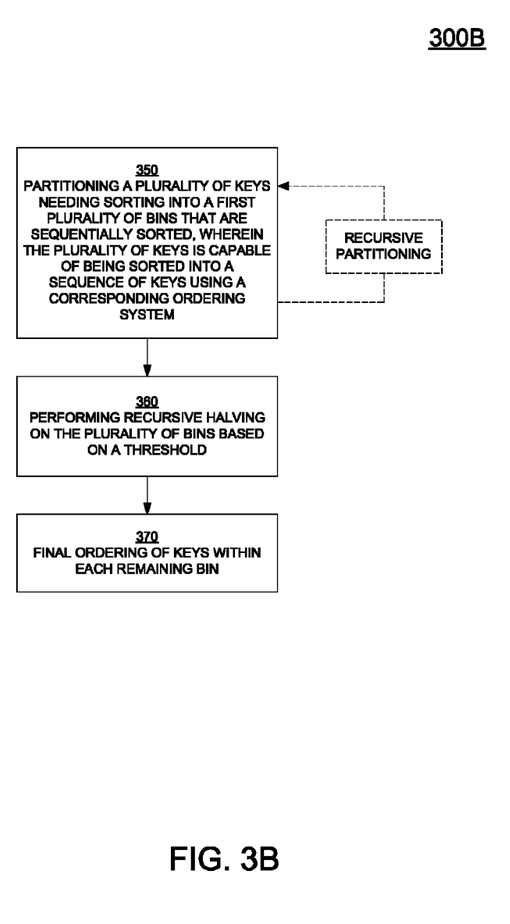
FIG. 3B is a flow diagram illustrating a method for sorting that implements a recursive process for performing bin-coalescing, in accordance with one embodiment of the present disclosure.
Figure 4:
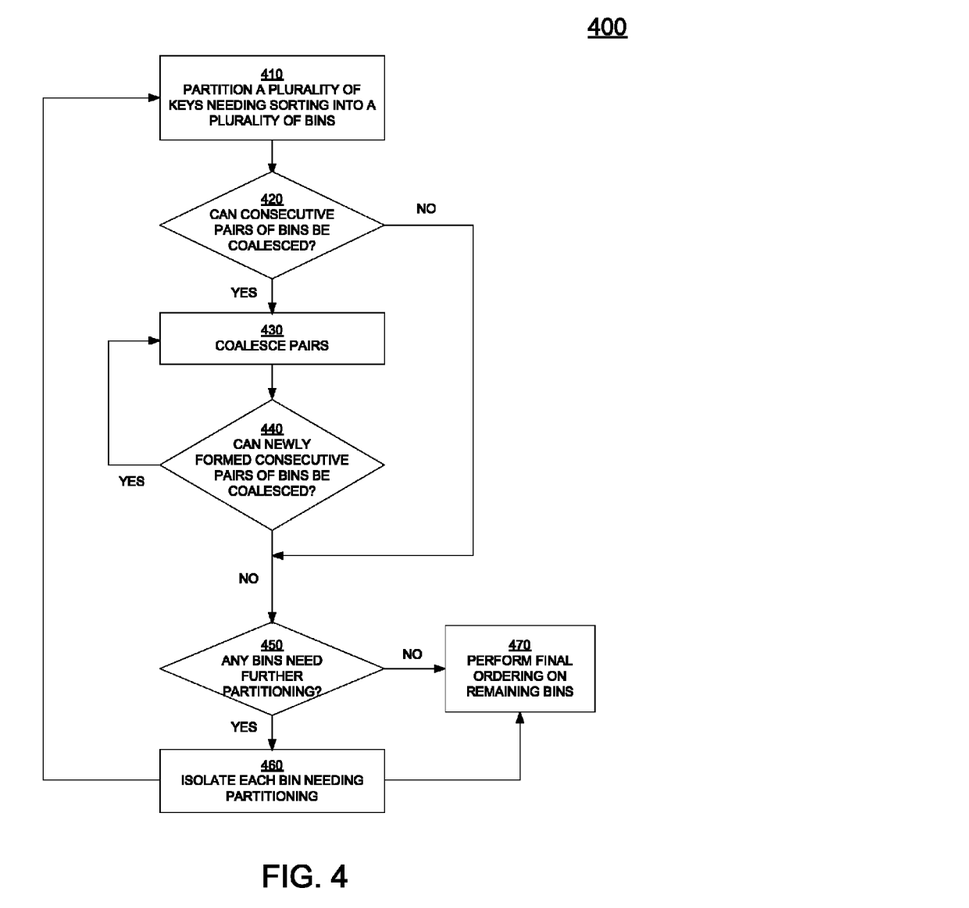
FIG. 4 is a flow diagram illustrating a method for sorting that includes coalescing child bins, in accordance with one embodiment of the present disclosure.

FIGS. 3A, 3B, and 4 are flowcharts of examples of computer-implemented methods for sorting including bin-coalescing that dynamically sacrifice previously performed splitting work to construct larger, more efficient bin sizes, according to embodiments of the present invention. Although specific steps are disclosed in the flowcharts, such steps are exemplary. That is, embodiments of the present invention are well-suited to performing various other steps or variations of the steps recited in the flowcharts.

Other embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer storage media and communication media. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared and other wireless media. Combinations of any of the above can also be included within the scope of computer-readable media.

Figure 1:
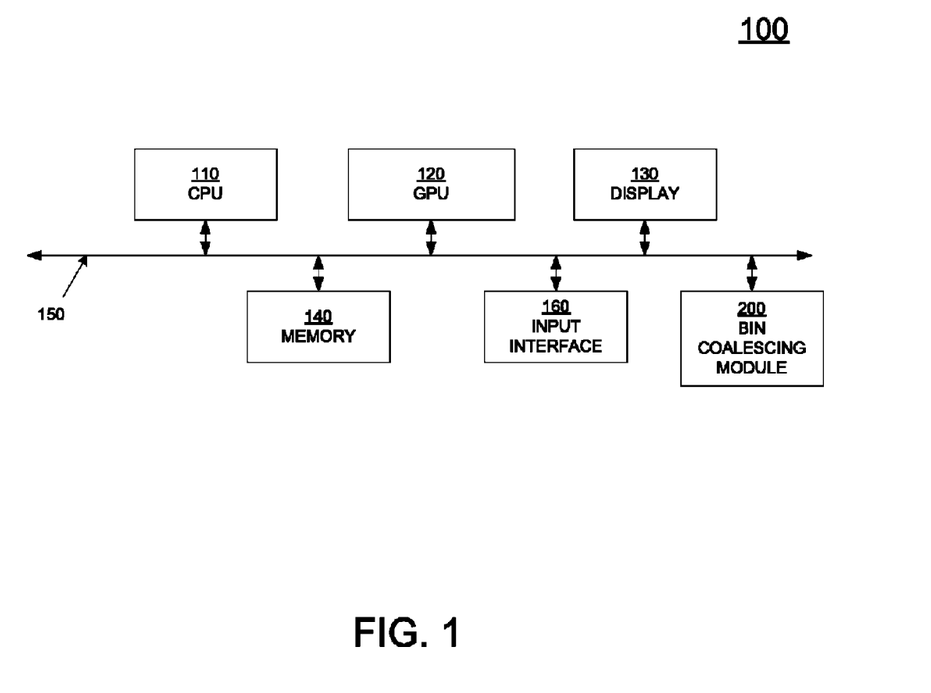
FIG. 1 depicts a block diagram of an exemplary computer system suitable for implementing the present methods, in accordance with one embodiment of the present disclosure.

FIG. 1 is a block diagram of an example of a computing system 100 capable of implementing embodiments of the present disclosure. Computing system 100 broadly represents any single or multi-processor computing device or system capable of executing computer-readable instructions. Examples of computing system 100 include, without limitation, workstations, laptops, client-side terminals, servers, distributed computing systems, handheld devices, or any other computing system or device. In its most basic configuration, computing system 100 may include at least one processor 110 and a system memory 140.

Both the central processing unit (CPU) 110 and the graphics processing unit (GPU) 120 are coupled to memory 140. System memory 140 generally represents any type or form of volatile or non-volatile storage device or medium capable of storing data and/or other computer-readable instructions. Examples of system memory 140 include, without limitation, RAM, ROM, flash memory, or any other suitable memory device. In the example of FIG. 1, memory 140 is a shared memory, whereby the memory stores instructions and data for both the CPU 110 and the GPU 120. Alternatively, there may be separate memories dedicated to the CPU 110 and the GPU 120, respectively. The memory can include a frame buffer for storing pixel data drives a display screen 130.

The system 100 includes a user interface 160 that, in one implementation, includes an on-screen cursor control device. The user interface may include a keyboard, a mouse, and/or a touch screen device (a touchpad).

CPU 110 and/or GPU 120 generally represent any type or form of processing unit capable of processing data or interpreting and executing instructions. In certain embodiments, processors 110 and/or 120 may receive instructions from a software application or hardware module. These instructions may cause processors 110 and/or 120 to perform the functions of one or more of the example embodiments described and/or illustrated herein. For example, processors 110 and/or 120 may perform and/or be a means for performing, either alone or in combination with other elements, one or more of the monitoring, determining, gating, and detecting, or the like described herein. Processors 110 and/or 120 may also perform and/or be a means for performing any other steps, methods, or processes described and/or illustrated herein.

The system 100 also includes a sorting module 200 configured to implement embodiments of the present invention. In particular, sorting module 200 is configured to perform bin-coalescing, such that previously partitioned bins of keys are dynamically sacrificed in order to construct larger, more efficient bin sizes for purposes of final sorting.

In some embodiments, the computer-readable medium containing a computer program may be loaded into computing system 100. All or a portion of the computer program stored on the computer-readable medium may then be stored in system memory 140 and/or various portions of storage devices. When executed by processors 110 and/or 120, a computer program loaded into computing system 100 may cause processor 110 and/or 120 to perform and/or be a means for performing the functions of the example embodiments described and/or illustrated herein. Additionally or alternatively, the example embodiments described and/or illustrated herein may be implemented in firmware and/or hardware.

Accordingly, embodiments of the present invention provide for a bin-coalescing technique used for improving the local, in-core efficiency of divide-and-conquer sorting strategies. In particular, embodiments provide for bin-coalescing in order to dynamically sacrifice previously performed splitting work in order to construct larger, more efficient bin sizes that are then internally sorted.

Although embodiments of the present invention are presented within the context of parallel, most-significant-digit (MSD) radix sorting, embodiments of the present invention are implementable within any top-down, divide-and-conquer approach where a partial ordering is applied to a sequence of keys, thereby creating two or more bins which can then be sorted independently. Examples of top-down partitioning approaches include the algorithmic families of sample sort, quicksort (e.g., with one or more pivots), burst sort, etc.

Figure 2:
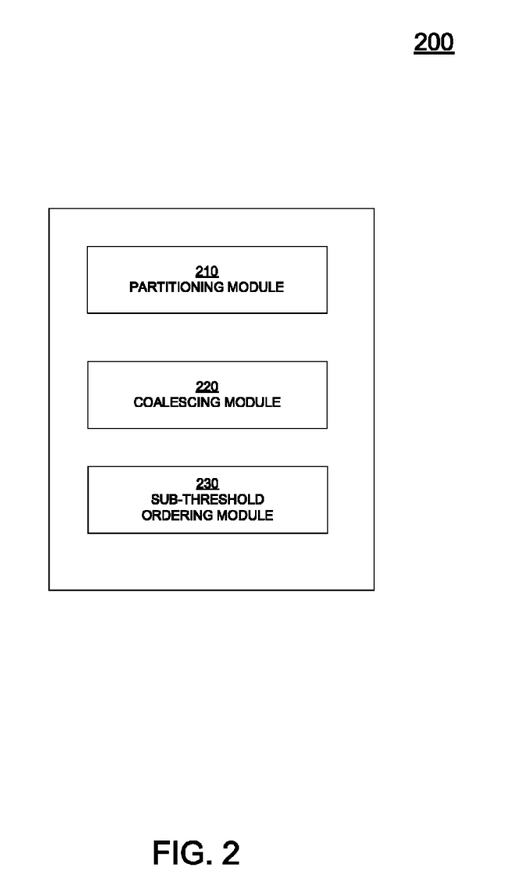
FIG. 2 is a block diagram of sorting system capable of performing bin-coalescing, in accordance with one embodiment of the present disclosure.

FIG. 2 is a block diagram of a system 200 configured to perform sorting, wherein the sorting includes bin-coalescing previously partitioned bins in order to construct larger, more efficient bin sizes that are then block sorted. System 200 includes a partitioning module 210 that is configured to perform a partial ordering as applied to a plurality of keys needing sorting into a sequence. The partitioning creates two or more bins which can then be sorted independently. A coalescing module 220 is configured to coalesce pairs of bins in order to construct larger, more efficient bin sizes that are then sorted into a sequence of keys. That is, previously partitioned bins may be coalesced into larger bins that are more efficient for sorting. The ordering module 230 performs final ordering or sorting of the remaining bins, wherein each bin is sorted or ordered into a sub-sequence of keys. When all ordered bins, that combined contain a plurality of keys, are individually sorted and concatenated, the keys are sorted into a sequence following an ordering system.

FIG. 3A is a flow diagram 300A illustrating a method for sorting including coalescing previously partitioned bins into larger bin sizes for purposes of more efficient final sorting, in accordance with one embodiment of the present disclosure. In still another embodiment, flow diagram 300A illustrates a computer implemented method for sorting including coalescing previously partitioned bins into larger bin sizes for purposes of more efficient final sorting. In another embodiment, flow diagram 300A is implemented within a computer system including a processor and memory coupled to the processor and having stored therein instructions that, if executed by the computer system causes the system to execute a method for sorting including coalescing previously partitioned bins into larger bin sizes for purposes of more efficient final sorting. In still another embodiment, instructions for performing a method as outlined in flow diagram 300A are stored on a non-transitory computer-readable storage medium having computer-executable instructions for causing a computer system to perform a method for sorting including coalescing previously partitioned bins into larger bin sizes for purposes of more efficient final sorting. The method outlined in flow diagram 300A is implementable by one or more components of the computer system 100 and sorting system 200 of FIGS. 1 and 2, respectively.

At 310, the method includes partitioning a plurality of keys needing sorting into a first plurality of bins. In addition, the plurality of keys is capable of being sorted into a sequence of keys using a corresponding ordering system (e.g., alphabetical lettering, numeric ordering, etc.). More particularly, the plurality of keys is partitioned into a partial ordering, wherein two or more bins are created which then can be sorted independently. Examples of such "top-down", partitioning-based sorting methods include sample sort, quicksort, burst sort, MSD radix sorting, etc.

Further, a given plurality of keys is partitioned into at most S bins. This process is conducted recursively such that each bin is itself partitioned into at most S child bins designated for further processing. This occurs until no bins contain elements numbering greater than some final-processing threshold B (e.g., 1, 128, 2048, etc.).

At 320, the method includes opportunistic coalescing of a first pair of consecutive bins into a resulting bin that is equal to or nearly equal to, but does not exceed, the final-processing threshold B. That is, before final processing of remaining bins, a pair of adjacent bins is identified and processed as targets for coalescing, reducing the plurality of remaining bins by one. In some embodiments, a second pair of consecutive bins in the second plurality of bins may be coalesced, i.e., coalescing is performed until no further pairings of consecutive bins can be coalesced without exceeding the threshold B. In these cases, each remaining bin may comprise more than one pair of coalesced bins.

Although bin coalescing has the effect of "undoing" some of the previous partitioning effort, such lost effort is far outweighed by the benefit of fuller bins formed for final block-sorting.

Any coalescing embodiment must observe the requirement that, once each remaining bin has been fully sorted internally, the consecutive concatenation of these remaining bins effectively realizes the sorted ordering of the original plurality of input keys. As a requirement, only neighboring, consecutive, or adjacent bins are candidates for coalescing.

In one embodiment, these bins can be described by memory offset and length. For each pair of coalesced bins, the previous logical bin descriptions are replaced with a new description whose offset is that of the leftmost comprising bin, and whose length is the sum of the lengths of each coalesced bin.

Different embodiments may choose to coalesce candidate pairings of adjacent bins in different orders. In one embodiment, the first pair of bins includes a previously coalesced pair. That is, candidate bins are considered one at a time, "greedily" coalescing adjacent bins until that aggregation would exceed a threshold B. In another embodiment, the order in which consecutive bins candidates are coalesced is chosen with the goal of globally maximizing the average size of the remaining bins.

At 330, the method includes a final ordering of keys in remaining bins to generate one or more sub-sequences of keys in the fully-sorted ordering of the original input plurality of keys. For example, a first remaining is ordered to generate a first sub-sequence of keys in the fully-sorted ordering of the original input plurality of keys. In one embodiment, the same sorting algorithm used to partition the keys is used to order keys. In another embodiment, a second sorting (e.g., block sorting) operation is used to order the keys in the remaining bins. This second sorting operation is typically designed and optimized for problems of size B, where B is the limit of keys that fit entirely within the resources of a single processor core (e.g., registers, cache, shared memory, etc.). For instance, embodiments of the invention implement a second sorting operation that includes, for example, insertion sort, bitonic sort, merge sort, least significant digit [LSD] radix sort, etc.).

Since the block sorting phase often comprises the majority of the overall sorting overhead, performing bin coalescing in embodiments of the present invention facilitates bin sizes that are more uniformly sized. For instance, as the average size of bins trends towards the threshold B, all threads and/or cores performing block sorting benefit from high utilization and even workload balance.

In one embodiment, the sorting is performed in parallel using a plurality of processor cores and/or processing threads. More particularly, the sorting (including partitioning and final ordering phases) is performed in parallel using a plurality of threads and/or processor cores which may be logical or physical in nature. In one embodiment, each plurality of keys (including pluralities that comprise previously partitioned bins as well as the original plurality of input keys), is partitioned and/or sorted by a separate thread and/or processor core. In this fashion, the amount of parallelism expressed expands as bins are further subdivided. In another embodiment, multiple threads and/or processor cores may work together to cooperatively partition and/or sort a given plurality of keys. As such, the amount of parallelism expressed can remain constant, typically matching that exposed by the underlying computer hardware.

FIG. 3B is a flow diagram illustrating a computer implemented method for sorting that implements a recursive process for performing bin-coalescing, in accordance with one embodiment of the present disclosure. That is, bins are coalesced in a recursive process, such that neighboring bins are continually coalesced until the bin size exceeds the threshold B. In another embodiment, flow diagram 300B is implemented within a computer system including a processor and memory coupled to the processor and having stored therein instructions that, if executed by the computer system causes the system to execute a method for sorting that implements a recursive process for performing bin-coalescing. In still another embodiment, instructions for performing a method as outlined in FIG. 3B are stored on a non-transitory computer-readable storage medium having computer-executable instructions for causing a computer system to perform a method for sorting that implements a recursive process for performing bin-coalescing. The method outlined in flow diagram 300B is implementable by one or more components of the computer system 100 and sorting system 200 of FIGS. 1 and 2, respectively.

At 350, the method includes partitioning a plurality of keys needing sorting into a first plurality of bins. In addition, the plurality of keys is capable of being sorted into a sequence of keys using a corresponding ordering system. The operation performed at 350 is analogous to the operation 310 in FIG. 3A.

At 360, the method includes performing recursive halving on the plurality of bins based on a threshold (e.g., threshold B). More specifically, at each stage of the recursive bin coalescing phase, each pair of consecutive bins is considered to determine whether their coalescing would exceed the threshold B. In one embodiment, these pairwise evaluations can be performed concurrently by parallel threads and/or processor cores. If a given pair can be coalesced, then the coalescing process is recursively applied to determine whether the next adjacent bin is capable of being absorbed. At each recursive step, the number of remaining bins may be reduced by up to half. The recursive process ends when the bin size exceeds the threshold B, at which point, the last cluster of coalesced bins with a size not exceeding the threshold B is set and ready for final ordering.

FIG. 4 is a flow diagram illustrating a computer implemented method for sorting that includes coalescing child bins, in accordance with one embodiment of the present disclosure. In another embodiment, flow diagram 400 is implemented within a computer system including a processor and memory coupled to the processor and having stored therein instructions that, if executed by the computer system causes the system to execute a method for sorting that includes coalescing child bins. In still another embodiment, instructions for performing a method as outlined in FIG. 4 are stored on a non-transitory computer-readable storage medium having computer-executable instructions for causing a computer system to perform a method for sorting that includes coalescing child bins. The method outlined in flow diagram 400 is implementable by one or more components of the computer system 100 and sorting system 200 of FIGS. 1 and 2, respectively.

The process illustrated in FIG. 4 is performed across one or more threads and/or processor cores. Further, individual operations in flow diagram 400 may be split off and performed by one or more threads and/or processor cores.

As shown in FIG. 4, at 410 the method includes partitioning a plurality of keys needing sorting into a plurality of bins. In addition, the plurality of keys is capable of being sorted into a sequence of keys using a corresponding ordering system.

At decision step 420, the method determines if consecutive pairs of bins can be coalesced. If no pairs can be coalesced, then the process proceeds to 450. On the other hand, if a pair of bins can be coalesced, then the process proceeds to 430 where consecutive bins in the plurality of bins are coalesced. For instance, consecutive bins are coalesced when their combined bin size falls below or is equal to a threshold B.

The method illustrates recursive halving when performing bin coalescing at decision step 440, where the method determines whether newly formed consecutive bins are capable of being coalesced. If so, then the process returns to 430 to coalesce consecutive bins recursively until the final coalesced bin size approaches but does not exceed the threshold B.

When it is determined that no further bins are capable of being coalesced, then the process proceeds to decision step 450, where it is further determined whether any of the remaining bins need further partitioning. That is, if all bins have sizes that are less than or equal to a threshold B, then the process turns to 470 where final ordering is performed on all remaining bins.

On the other hand, if there are bins that need further sorting (i.e., they have bin sizes that exceed the threshold B), then the process proceeds to 460 where each bin needing further partitioning is isolated. Each of the isolated bins are then further partitioned by returning to step 410, on the same or on a separate thread and/or processor core. Further, remaining bins that do not need further partitioning are ready for final ordering. This final ordering process is independently handled from the partitioning process, and may occur simultaneously, concurrently, and/or sequentially to the partitioning process on the same or different threads and/or processor cores used to perform partitioning.

In one embodiment, for comparison-based sorting, bin coalescing can be viewed as a form of graph clustering. That is, a sequence of weighted vertices needing clustering is presented along a linear path graph. The clustering criteria include maximizing the average cluster weight without forming any clusters whose aggregate weight exceeds the threshold B.

Figure 5:
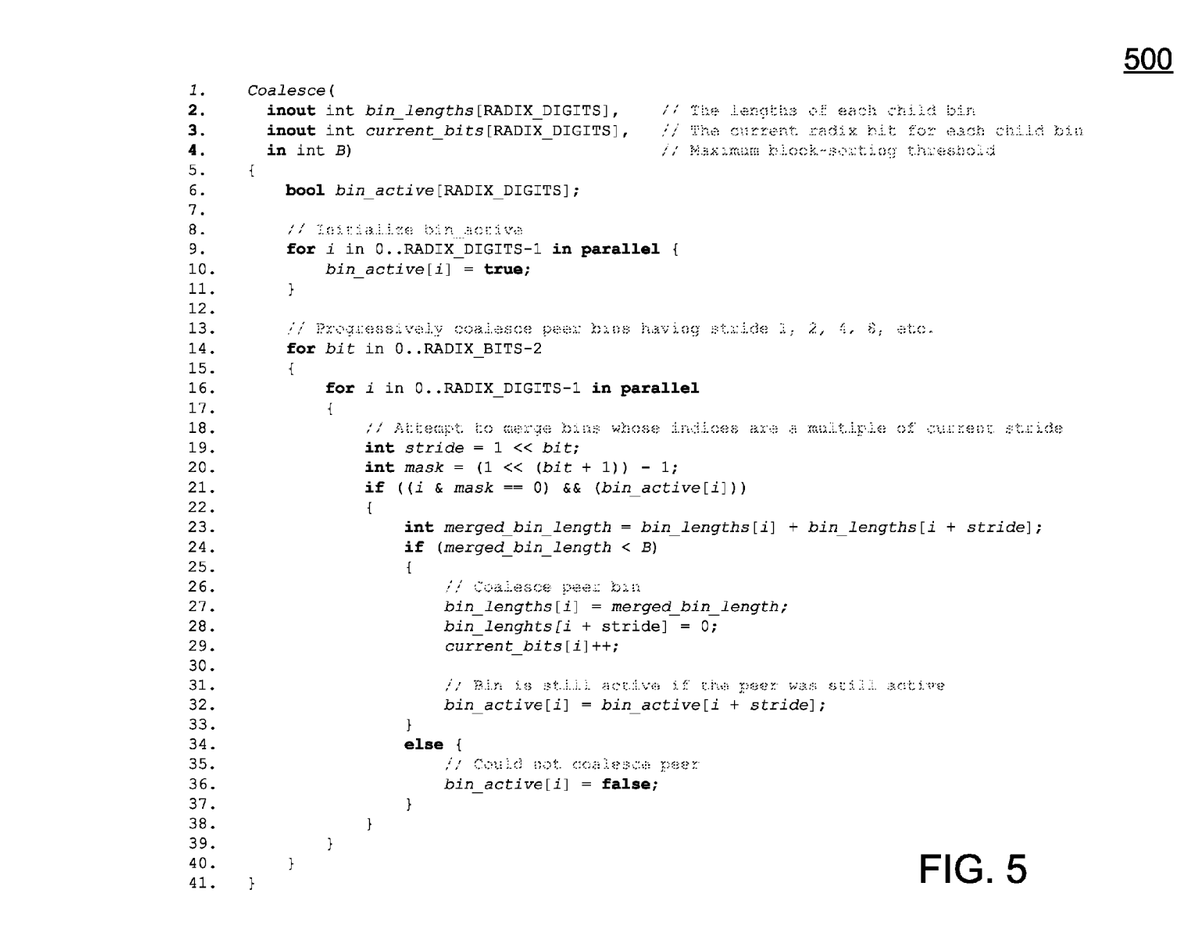
FIG. 5 is an illustration of parallel pseudocode for coalescing MSD child bins when performing sorting of a plurality of keys, in accordance with one embodiment of the present disclosure.

FIG. 5 is an illustration of parallel pseudocode 500 for coalescing child bins in the context of the most significant digit (MSD) radix sorting method, in accordance with one embodiment of the present disclosure. Pseudocode 500 is exemplary and is intended to show one method for performing sorting (e.g., MSD radix sorting) to include bin coalescing for purposes of illustration. For example, pseudocode 500 illustrates a bin clustering heuristic for MSD sorting that coalesces adjacent bins in a way that minimizes the loss of prefix bit progress, and also is amenable to local parallel computation.

For a given splitting factor (e.g., S =RADIX_DIGITS), the algorithm presented in pseudocode 500 iteratively tries to coalesce pairs of bins whose keys are separated by progressively shorter substrings of prefix bits/characters/digits, i.e., it prefers to coalesce bins having longer common prefixes. For instance, pseudocode 600 first tries to coalesce odd bins into even bins (e.g., 0←1, 2←3, 4←5, and 6←7). The resulting bins lose one bit of radix progress. If successful, it is attempted to coalesce pairs of bins having multiple-of-two indices (e.g., 0←2, and 4←6), which loses another bit of radix progress. Once a bin has failed to coalesce a peer, it is not eligible to coalesce more distant peers. This property is transitive, such that if bin A coalesced bin B, which failed to coalesce bin C, then bin A also becomes ineligible for coalescing more distant peers. The work complexity of this bin-coalescing algorithm is $O(S \log_2 S)$.

Figure 6:
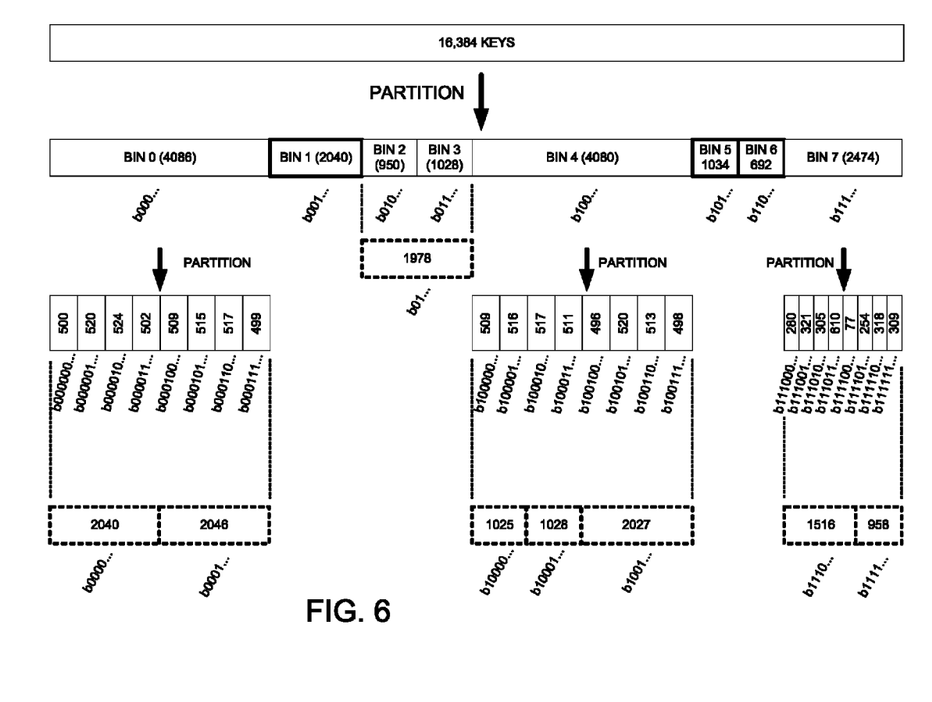
FIG. 6 is an illustration of the application of bin-coalescing by MSD prefix in an 8-way (3-bit) MSD sorting strategy, in accordance with one embodiment of the present disclosure.

FIG. 6 is an illustration of the application of bin-coalescing by MSD prefix in an 8-way (3-bit) MSD sorting strategy as implemented by pseudocode 500, in accordance with one embodiment of the present disclosure. In this particular example, a plurality of 16,384 keys is presented for sorting into a sequence following an ordering system. First, the plurality of keys is partitioned into a plurality of bins, as previously described (e.g., using a sorting algorithm including MSD radix sorting, splitting, sample sort, quicksort, etc.). Each plurality of keys is partitioned 8-ways, which is static in that the number of partitions is not dynamically changed as partitioning steps are recursively applied.

Without coalescing, the keys at each level in the tree would have all been binned to the same bitwise digit place. (Bins are labeled by the common bitwise prefix of the keys they comprise.) As such, all bins at each level would have the same number of remaining bits to sort over, as shown in the first partitioning of the 16,348 keys in FIG. 6.

However, bin-coalescing complicates the bitwise progression of MSD sorting. Coalescing two consecutive bins effectively pushes the radix progression back up by at least one bit for the resulting bin. For example, it creates a more general prefix with more remaining bits to sort over. As shown in FIG. 6, the bins "b010 . . . " and "b011 . . . " have been coalesced to form a bin with prefix "b01 . . . ". In one embodiment, bin descriptions also track their own bitwise radix progress independently.

As shown, the plurality of bins includes bins of the following sizes: bin 0 (4086); bin 1 (2040); bin 2 (950); bin 3 (1028); bin 4 (4080); bin 5 (1034); bin 6 (692); and bin 7 (2474). The bins are arranged according to their most significant bits that are shared. For instance, keys in the bin 0 all share the same prefix "b000 . . . "; keys in bin 1 share prefix "b001 . . . "; keys in bin 2 share prefix "b010 . . . "; keys in bin 3 share prefix "b011 . . . "; keys in bin 4 share prefix "b100 . . . "; keys in bin 5 share prefix "b101 . . . "; keys in bin 6 share prefix "b110 . . . "; and keys in bin 7 share prefix "b111 . . . ". For purposes of bin coalescing all these bins 0-7 have ACTIVE flags that indicate that corresponding bin is available for coalescing a distant peer (e.g., to the right in FIG. 6).

At this point, bin coalescing is performed. That is, it is determined whether consecutive pairs of bins are capable of being coalesced. Using one technique illustrated in pseudocode 500 of FIG. 5, progressively more distant pairs of bins are potentially coalesced, i.e., bins that are separated by progressively smaller shared prefixes. In this embodiment, the number of bins that are unmasked and can consider agglomerating peers is recursively halved. To begin, odd bins are analyzed to determine if they can be coalesced into even bins. Specially, bins 0, 2, 4, and 6 are unmasked. Because all four unmasked bins are flagged ACTIVE, all four of these bins can attempt to agglomerate consecutive and neighboring peers.

In particular, a pair of bins includes bins 0 and 1, which cannot be coalesced because they exceed the threshold B. In this case, bin 0 changes its flag to INACTIVE, though the flag of bin 1 remains ACTIVE. As shown, a pair of bins 2-3 are coalesced into a coalesced bin of size 1978. That is, bin 2 now is of size 1978, and bins 2 and 3 have flags that remain ACTIVE. Also, a pair of bins 4-5 cannot be coalesced, and as such the flag for bin 4 is INACTIVE, though the flag for bin 5 remains ACTIVE. Further, a pair of bins 6-7 cannot be coalesced, in which case bin 6 changes its flag to INACTIVE, though the flag of bin 7 remains ACTIVE.

In the next phase of coalescing, bins 1, 2, 3, and 5, and 7 remain ACTIVE. Bins 0 and 4 are unmasked. Because neither of these bins is INACTIVE, they each cannot attempt to agglomerate neighboring peers.

Also, bins that need further partitioning are identified. For instance, bins 0, 4, and 7 are identified as needing further portioning because they are of a size that exceeds the threshold B. The identified bins are separated and a new sorting process is independently performed on each of these bins, such as, performing partitioning, bin coalescing and final sorting. As shown, bin 0 is partitioned 8-ways into bins of sizes 500, 520, 524, 502, 509, 515, 517, and 499. During the recursive halving coalescing phase, these bins are coalesced recursively into 2 bins of sizes 3040, and 2046. Also, bin 4 is partitioned 8-ways into bins of sizes 509, 516, 517, 511, 496, 520, 513, and 498. During the recursive halving coalescing phase, these bins are coalesced recursively into 3 bins of sizes 1025, 1028, and 2027 that are ready for final block sorting. Further, bin 7 is partitioned 8 ways into bins of sizes 280, 321, 305, 610, 77, 254, 318, and 309. During the recursive halving coalescing phase, these bins are coalesced recursively into 2 bins of sizes 1516 and 958 that are ready for final block sorting.

Further, in all of these coalescing phases, bins that are ready for final block sorting are also indentified. For instance, bins 0, 5, and 6 are identified without further coalescing for final block sorting. Thereafter, the bin of size 1978 (dotted block) that coalesced bins 2 and 3 is also identified for final block sorting. Also, bins that were further partitioned into sub-bins that were then coalesced are also identified for sorting (e.g., bins of sizes 2040, 2046, 1025, 1028, 2027, and 1516, and 958 also identified as dotted blocks).

As a further illustration of bin coalescing, consider 8 partitioned bins 0-7. In the first step, all bins 0-7 are labeled ACTIVE. Even bins 0, 2, 4, and 6 are unmasked. Because all four unmasked bins are still flagged ACTIVE, they each can attempt to agglomerate neighboring peer bins. Consider the following scenario where bins 0, 4, and 6 successfully agglomerate peer bins 1, 5, and 7, respectively, because their combined sizes are less than or equal to the threshold B. Bins 0, 4, and 6 remain ACTIVE because their agglomerated peers were also flagged ACTIVE, such that no gaps occur between the agglomerated peers. On the other hand, bin 2 is unable to merge with bin 3 because the combined size exceeds the threshold B. As such, bin 2 is flagged INACTIVE.

In the second step, bins 0, 1, 3, 4, 5, 6, and 7 are still labeled ACTIVE. Now, bins 0 and 4 are unmasked. Because bins 0 and 4 are still ACTIVE, both can attempt to agglomerate peers. Consider the following scenario where bins 0 and 4 successfully agglomerate peer bins 2 and 6, respectively, again because their combined sizes are under the threshold B. Bin 0 can still agglomerate an bin 2 that is marked INACTIVE. Now, bin 0 is flagged INACTIVE because its agglomerated peer (bin 2) was flagged INACTIVE, thereby indicating that bin 0 cannot further agglomerate distant peers because there is a gap between neighboring bins. Also, bin 4 remains ACTIVE because its agglomerated peer bin 6 was also flagged ACTIVE.

In the third step, bins 1, 3, 4, 5, 6, and 7 are labeled ACTIVE. Bin 0 is unmasked. Because bin 0 is flagged INACTIVE, it cannot attempt agglomeration.

Thus, according to embodiments of the present disclosure, systems and methods are described providing for bin-coalescing that is used for improving the local, in-core efficiency of divide-and-conquer sorting strategies.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples in that many architectural variants can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein. One or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface. Various functions described herein may be provided through a remote desktop environment or any other cloud-based computing environment.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

Embodiments according to the present disclosure are thus described. While the present disclosure has been described in particular embodiments, it should be appreciated that the disclosure should not be construed as limited by such embodiments, but rather construed according to the below claims.

What is claimed:

1. A non-transitory computer readable medium having computer executable instructions for causing a computer system to perform a method for sorting, wherein said method comprises:
   partitioning a plurality of keys needing sorting into a first plurality of bins that are sequentially sorted, wherein said plurality of keys is capable of being sorted into a sequence of keys using a corresponding ordering system;
   coalescing a first pair of consecutive bins in isolation from other bins in a first coalescing operation, such that when coalesced said first pair of consecutive bins falls below a threshold;
   ordering keys in said first pair of consecutive bins that is coalesced to generate a first sub-sequence of keys in said sequence of keys;

repeatedly choosing candidate pairs for coalescing by recursive halving of remaining bins in plurality of bins;

in parallel using a plurality of processor cores, generating a second plurality of bins by determining when to coalesce each of a plurality of pairs of consecutive bins in said first plurality of bins, such that a pair of consecutive bins when coalesced falls below said threshold; and partitioning, by a top-down, divide-and-conquer sorting algorithm, said plurality of keys into said plurality of bins.

2. The computer readable medium of claim 1, wherein said method further comprises:

further coalescing a second pair of consecutive bins from remaining bins in said plurality of bins, wherein one or both of said second pair may comprise a previously coalesced pair.

3. The computer readable medium of claim 1, wherein said method further comprises:

repeatedly choosing candidate pairs for coalescing by favoring bins for coalescing having lower indices.

4. The computer readable medium of claim 1, wherein said method further comprises:

repeatedly choosing candidate pairs for coalescing by seeking to maximize an average bin size of remaining bins in said plurality of bins.

5. The computer readable medium of claim 1, wherein said method further comprises:

applying a most significant digit (MSD) radix sort as said sorting algorithm to partition said plurality of keys into said plurality of bins.

6. The computer readable medium of claim 1, wherein said ordering system in said method comprises a numbering system.

7. The computer readable medium of claim 1, wherein said method further comprises:

partitioning a first bin of said first plurality of bins into a plurality of sub-bins;

coalescing a pair of consecutive sub-bins in said plurality of sub-bins, such that when coalesced said pair of sub-bins falls below a threshold; and ordering keys in said pair to generate a second sub-sequence of keys in said sequence of keys.

8. A computer system comprising:

a processor; and memory coupled to said processor and having stored therein instructions that, if executed by a computer system, causes said computer system to execute a method for sorting, comprising:

partitioning a plurality of keys needing sorting into a first plurality of bins that are sequentially sorted, wherein said plurality of keys is capable of being sorted into a sequence of keys using a corresponding ordering system;

coalescing a first pair of consecutive bins in isolation from other bins in a first coalescing operation, such that when coalesced said first pair of consecutive bins falls below a threshold;

ordering keys in said first pair of consecutive bins that is coalesced to generate a first sub-sequence of keys in said sequence of keys;

repeatedly choosing candidate pairs for coalescing by recursive halving of remaining bins in said plurality of bins;

in parallel using a plurality of processor cores, generating a second plurality of bins by determining when to coalesce each of a plurality of pairs of consecutive bins in said first plurality of bins, such that a pair of consecutive bins when coalesced falls below said threshold; and partitioning, by a top-down, divide-and-conquer sorting algorithm, said plurality of keys into said plurality of bins.

9. The computer system of claim 8, wherein said method further comprises:

further coalescing a second pair of consecutive bins in from remaining bins in said plurality of bins.

10. The computer system of claim 9, wherein at least one of said second pair comprises a previously coalesced pair.

11. The computer system of claim 8, wherein said method further comprises:

repeatedly choosing candidate pairs for coalescing by favoring bins for coalescing having lower indices.

12. The computer system of claim 8, wherein said method further comprises:

applying a most significant digit (MSD) radix sort as said sorting algorithm to partition said plurality of keys into said plurality of bins.

13. The computer system of claim 8, wherein said ordering system in said method comprises a numbering system.

14. The computer system of claim 8, wherein said method further comprises:

partitioning a first bin of said first plurality of bins into a plurality of sub-bins; coalescing a pair of consecutive sub-bins in said plurality of sub-bins, such that when coalesced said pair of sub-bins falls below a threshold; and ordering keys in said pair to generate a second sub-sequence of keys in said sequence of keys.

* * * * *